A. E. HARRIS.
Nut-Lock.

No. 168,156. Patented Sept. 28, 1875.

WITNESSS
B. F. Weatherdon
W. B. Weatherdon

INVENTOR.
A. E. Harris.

UNITED STATES PATENT OFFICE.

ALFRED ELLIS HARRIS, OF LONDON, ENGLAND.

IMPROVEMENT IN NUT-LOCKS.

Specification forming part of Letters Patent No. 168,156, dated September 28, 1875; application filed May 10, 1875.

*To all whom it may concern:*

Be it known that I, ALFRED ELLIS HARRIS, of London, England, have invented a new construction of nut and mode of fixing and releasing the same, of which the following is a specification:

Lock-nuts have been heretofore made by the insertion of a pawl through a mortise in the nut, so that said pawl shall act against ratchet-teeth upon the bearing-surface and prevent the nut from becoming loose.

My improved nut may be used upon plumber-blocks or other parts of machinery, axles of carts and other vehicles, fish-plate joints for railways, or any other kind of mechanism in which bolts and nuts are used; and consists in a spring-pawl upon a pivot, and within a recess or cavity formed in the nut, the end of which pawl takes into teeth or countersunk niches cut in the surface upon which the nut rests, in combination with a spring for pressing the pawl toward the teeth of the ratchet, and a small set-screw or pin passing through the nut, and bearing upon the opposite end of the pawl, whereby it may be released from the ratchet, when required, to unscrew the nut. The pivot on which the pawl turns should be made of copper or brass, or other metal, previously coated or otherwise for preventing corrosion.

Figure 1:
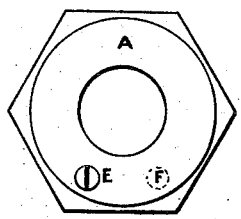
Figure 3:
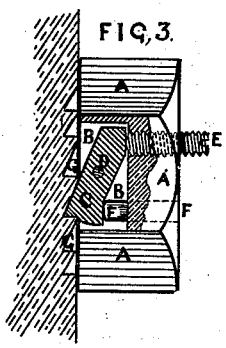
Figure 2:
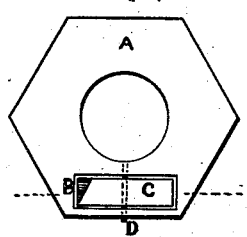
Figure 4:
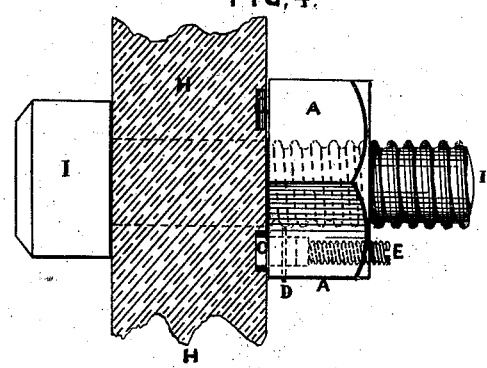
Figure 5:
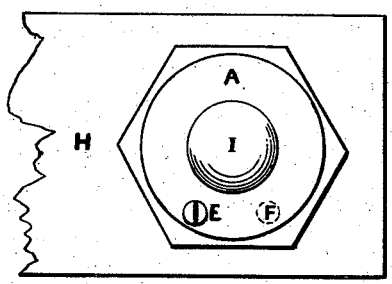
Figure 6:
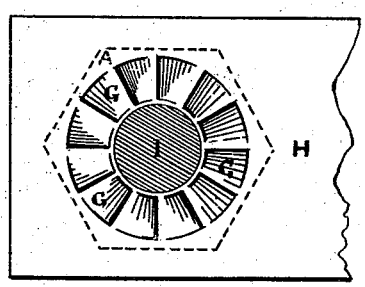

The accompanying drawings represent at Figure 1 a detached front view of the safety-nut; Fig. 2, back view of same; Fig. 3, section taken through the dotted line in Fig. 2, showing the spring-pawl within the ratchet-teeth; Fig. 4, longitudinal section of a bolt, with the nut screwed down and immovably fixed; Fig. 5, end view thereof complete; and Fig. 6, corresponding view with nut removed, showing the face of the ratchet formed in the outer surface, into which the pawl takes.

In each figure the same letters of reference denote similar corresponding parts.

A, the nut; B, the recess; C, the pawl; D, pivot on which it works; E, set-screw or pin for depressing the end of the pawl and liberating it from the ratchet for unscrewing the nut; F, india-rubber or other spring for holding the pawl in the ratchet, as seen at Fig. 3; G, the ratchet cut in outer surface of the substance H to be held; I, the bolt. Thus, in turning the nut round upon the bolt, the pawl is finally caught in one of the teeth of the ratchet and retained, so as to prevent the nut from being removed until the set-screw has been screwed down to liberate the pawl.

I claim as my invention—

The set-screw or pin E, in combination with the spring-pawl C, nut A, and ratchet-teeth G, substantially as and for the purposes set forth.

A. E. HARRIS.

Witnesses:
B. F. WEATHERDON,
   *Law Chambers, Chancery Lane, London.*
G. F. WARREN,
   *17 Gracechurch Street, London.*